United States Patent [19]

Gudat et al.

[11] Patent Number: 4,571,176

[45] Date of Patent: Feb. 18, 1986

[54] BUCKET WHEEL VALVE

[75] Inventors: Gerhard Gudat, Oelde; Gotthardt Blascyk, Beckum; Friedrich Wingenfeld, Warendorf, all of Fed. Rep. of Germany

[73] Assignee: Krupp Polysius AG, Beckum, Fed. Rep. of Germany

[21] Appl. No.: 609,432

[22] Filed: May 11, 1984

[30] Foreign Application Priority Data

Jun. 9, 1983 [DE] Fed. Rep. of Germany ....... 3320930

[51] Int. Cl.⁴ .......................... F24J 3/00; F16K 49/00; B67D 5/64
[52] U.S. Cl. .................................. 432/226; 137/340; 222/170; 414/189

[58] Field of Search ............... 432/225, 226; 414/189, 414/220, 221; 222/170; 137/340

[56] References Cited

U.S. PATENT DOCUMENTS 1,958,228  5/1934  Beardsley ........................... 137/340
3,610,476  10/1971  Starrett ............................. 414/220

Primary Examiner—John J. Camby
Attorney, Agent, or Firm—Learman & McCulloch

[57] ABSTRACT

The invention relates to a bucket wheel valve heated by hot gas flowing through an axial gas chamber in a rotor which is spaced axially from the side walls of a housing. The spaces between the rotor and the side walls are screened from the exterior in the radial direction by annular members forming extensions of the chamber.

5 Claims, 2 Drawing Figures

BUCKET WHEEL VALVE

The invention relates to a bucket wheel valve having a number of cells arranged in regular peripheral order around a rotor shaft for use with loose material that tends to cake.

BACKGROUND OF THE INVENTION

A bucket wheel valve of the type referred to is known from the company journal "Polysius teilt mit" No. 90 (August 1981) page 4, illustration 6.

In this bucket wheel valve hot gas is passed through the flow chamber between the rotor shaft and the cell walls, and therefore even on the outside of the cell walls the surface temperature is so high that the troublesome formation of deposits is avoided.

An object of the present invention is to improve the known bucket wheel valve so that the quantity of hot gas required for heating the bucket wheel valve is minimized.

SUMMARY OF THE INVENTION

A bucket wheel valve according to the invention is provided with annular members on opposite sides of a housing in which the rotor is mounted that form extensions of a gas flow chamber in the rotor through which hot gas can be supplied to and discharged from the chamber without gas escaping through gaps between the rotating and stationary parts of the bucket wheel valve. The annular members also prevent an undesirably large quantity of additional air from being drawn in through the gaps.

THE DRAWINGS

A preferred embodiment of the invention is disclosed in the following description and in the accompanying drawings, wherein.

DETAILED DESCRIPTION

Figure 1:
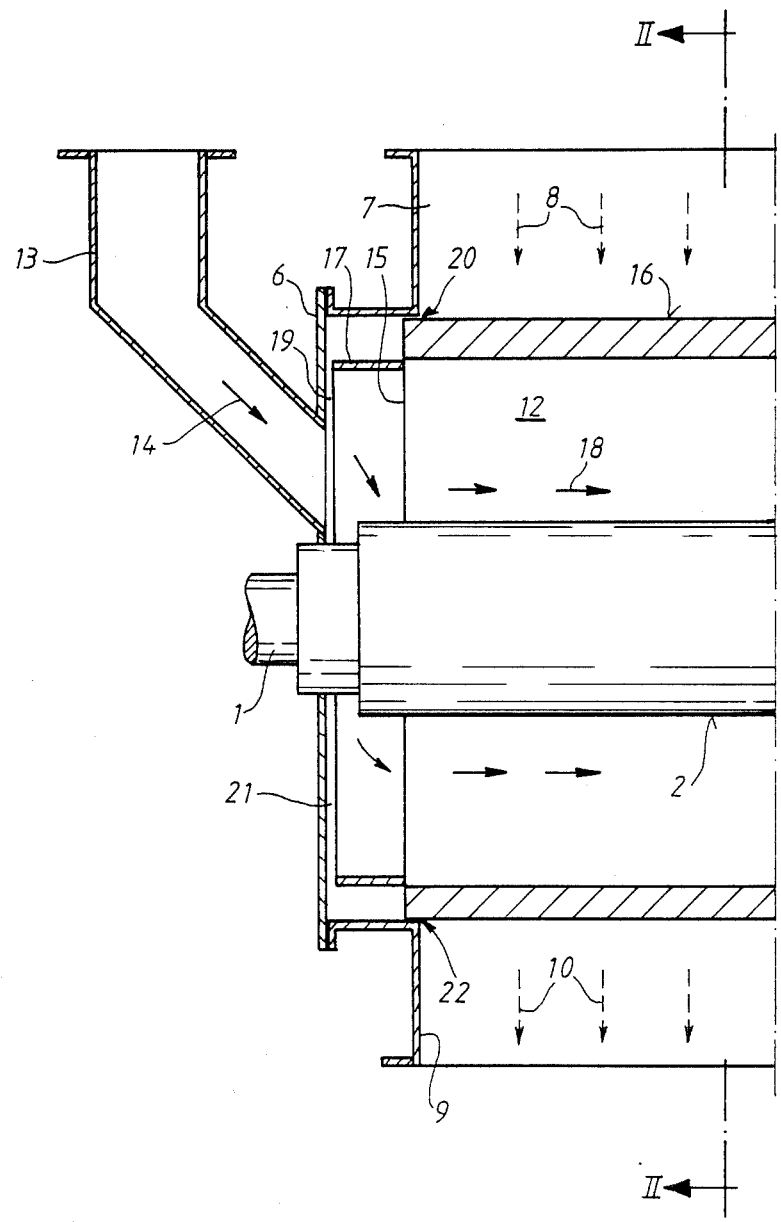
FIG. 1 is a longitudinal section through a bucket wheel valve.
Figure 2:
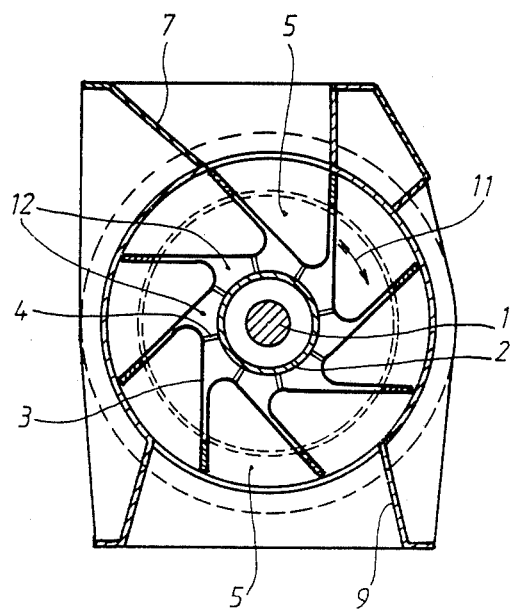
FIG. 2 is a cross-section taken along the line II—II of FIG. 1.

The bucket wheel valve according to the invention has a rotor shaft 1 rotatable about an axis and extending through a cylindrical supporting body 2 on which a number of cell walls 3 are mounted by means of crosspieces 4. The cell walls 3 form cells 5 which are open to the exterior and which serve to receive the loose material.

The rotor shaft 1 extends through a stationary housing 6 having side, top, and bottom walls. The top wall has an opening in communication with a material supply hopper 7 from which the loose material falls in the direction of the arrows 8 into a cell 5 which has just arrived in the upper position. In addition the bottom wall of the housing 6 is provided with a material discharge opening 9 through which the loose material is discharged in the direction of the arrows 10 from the cell 5 which has just arrived in a lower position. The direction of rotation of the rotor is indicated by the arrow 11.

Air flow chambers 12 are formed by the supporting body 2 and the cell walls 3, and extend axially of the rotor shaft 1. Since the two end regions are of symmetrical construction, only one end is illustrated in FIG. 1.

A hot gas duct 13 leads to an opening in one side wall of the housing 6 and through which the hot gas flows in the direction of the arrow 14 into the housing 6. There is an axial space between the end 15 of the rotor 16 and the adjacent end wall of the housing 6, and this space is screened from the exterior in a radial direction by a tubular member 17 which forms an extension of the air flow chambers 12. This tubular member 17 is connected to the rotor 16 so as to be fixed against relative rotation and is open towards the end (i.e. towards the connection side for the hot gas duct 13).

As a result the hot gas flows out of the hot gas duct 13 through the space screened from the exterior by the tubular member 17 and then passes into the flow chambers 12 through which it passes in the axial direction in the direction of the arrows 18. The hot gas comes into heat-conducting contact with the cell walls 3 which are thereby effectively heated. After flowing through the flow chambers 12 the hot gas is discharged at the other end of the rotor 16 and is led off in a similar manner. An annular member like the member 17 is connected to the discharge end of the rotor so as to be fixed against relative rotation and provides for a smooth and undisturbed discharge of the gas from the bucket wheel valve.

The annular members 17 provided in the region of the hot gas supply and hot gas discharge are between the levels of the top and bottom walls of the housing and thus prevent hot gas from escaping through the gaps 19, 20 or 21, 22 into the regions of the material supply hopper 7 or the material discharge opening 9 and prevent an undesirably large quantity of additional air from being drawn in from these regions.

Thus the annular members 17 make it possible to minimize the quantity of hot gas necessary for the heat exchange and to avoid a bypass stream which would lead to high heat losses. At the same time by using the members 17 the gas speed in the axial flow chambers 12 can be influenced so accurately that no damaging dust deposits occur in these flow chambers.

We claim:

1. In a bucket wheel valve having a housing provided with opposite sides, a rotor rotatable about an axis and having walls defining a plurality of circumferentially spaced cells radially outward of said axis for the accommodation and rotary transport of loose material, means mounting said rotor within said housing for rotation about an axis and spaced from said sides, at least one gas flow chamber extending axially of said rotor and defined in part by said walls, an opening in each of said sides, hot gas supply means in communication with the opening in one of said sides and hot gas discharge means in communication with the opening in the other of said sides, the improvement comprising tubular means carried by said rotor at each end thereof and spanning the space between said rotor and the sides of said housing, said tubular means constituting extensions of said chamber at opposite ends of said rotor.

2. A bucket wheel valve according to claim 1 wherein each of said tubular means is annular.

3. A bucket wheel valve according to claim 2 wherein each of said tubular means is of substantially uniform diameter.

4. A bucket wheel valve according to claim 2 wherein the diameter of each of said tubular means corresponds substantially to that of said gas flow chamber.

5. A bucket wheel valve according to claim 1 wherein said housing has a top wall provided with a material delivery opening and a bottom wall provided with a material discharge opening, said tubular means occupying a level below that of said top wall and above that of said bottom wall.

* * * * *